(12) United States Patent
Kim et al.

(10) Patent No.: US 12,253,881 B2
(45) Date of Patent: Mar. 18, 2025

(54) FOLDABLE DISPLAY DEVICE

(71) Applicant: SAMSUNG DISPLAY CO., LTD., Yongin-si (KR)

(72) Inventors: Yunjae Kim, Cheonan-si (KR); Hoseung Kang, Asan-si (KR); Jong-Hyun Lee, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 93 days.

(21) Appl. No.: 17/821,845

(22) Filed: Aug. 24, 2022

(65) Prior Publication Data

US 2023/0221759 A1 Jul. 13, 2023

(30) Foreign Application Priority Data

Jan. 7, 2022 (KR) .................. 10-2022-0002586

(51) Int. Cl.
*G06F 1/16* (2006.01)

(52) U.S. Cl.
CPC .......... *G06F 1/1616* (2013.01); *G06F 1/1643* (2013.01); *G06F 1/1652* (2013.01); *G06F 1/1656* (2013.01)

(58) Field of Classification Search
CPC .... G06F 1/1616; G06F 1/1643; G06F 1/1652; G06F 1/1656; Y02E 10/549; G09F 9/301; H10K 50/841; H10K 59/40; H10K 77/111; H10K 2102/311
See application file for complete search history.

(56) References Cited

U.S. PATENT DOCUMENTS

| 10,198,040 | B2 | 2/2019 | Zhang et al. |
| 10,461,268 | B2* | 10/2019 | Jiang .................... H10K 77/111 |
| 10,755,991 | B2* | 8/2020 | Park ........................ B32B 15/09 |
| 10,930,883 | B2* | 2/2021 | Park ........................ G06F 1/1641 |
| 11,003,217 | B2* | 5/2021 | Cha ......................... G06F 1/1681 |
| 11,048,295 | B1* | 6/2021 | Smeeton ................. G09F 9/301 |
| 11,258,035 | B2* | 2/2022 | Kim ........................ H05K 1/147 |
| 11,573,664 | B1* | 2/2023 | Slassi .................. G06F 3/04184 |
| 11,675,393 | B2* | 6/2023 | Kim ...................... B32B 15/095 |
| | | | 361/679.27 |
| 11,747,861 | B2* | 9/2023 | Zhang .................. G06F 1/1652 |
| | | | 361/679.27 |
| 2018/0366679 | A1* | 12/2018 | Kim ...................... B32B 27/281 |
| 2020/0355216 | A1* | 11/2020 | Bae ........................ G06F 1/1652 |
| 2020/0366770 | A1* | 11/2020 | Kim ........................ H04M 1/0264 |
| 2020/0383219 | A1* | 12/2020 | Hale ....................... E05D 3/122 |

(Continued)

FOREIGN PATENT DOCUMENTS

KR 10-2020-0084495 7/2020

*Primary Examiner* — Rockshana D Chowdhury

(74) *Attorney, Agent, or Firm* — F. Chau & Associates, LLC

(57) ABSTRACT

A foldable display device includes a display module including a first non-folding area, a second non-folding area, and a folding area between the first non-folding area and the second non-folding area, a support member disposed below the display module and including a first support layer overlapping the first non-folding area, a second support layer overlapping the second non-folding area, and a pattern layer overlapping the folding area, surrounding the first support layer and the second support layer, and including a conductive metal material, and a digitizer disposed below the support member.

20 Claims, 10 Drawing Sheets

(56) References Cited

U.S. PATENT DOCUMENTS

| | | | |
|---|---|---|---|
| 2021/0068276 A1* | 3/2021 | Kim | H05K 5/0017 |
| 2021/0118337 A1* | 4/2021 | Park | G09F 9/301 |
| 2021/0174711 A1* | 6/2021 | Cho | H10K 59/10 |
| 2021/0382367 A1* | 12/2021 | Hashimoto | G06F 1/1652 |
| 2022/0199921 A1 | 6/2022 | Kim et al. | |
| 2022/0309964 A1* | 9/2022 | Wang | G06F 1/1616 |
| 2023/0021348 A1* | 1/2023 | Cho | G06F 1/1616 |
| 2023/0200204 A1* | 6/2023 | Lee | H10K 85/221 |
| | | | 257/72 |

* cited by examiner

FOLDABLE DISPLAY DEVICE

CROSS-REFERENCE TO RELATED APPLICATION(S)

This U.S. non-provisional patent application claims priority under 35 USC § 119 to Korean Patent Application No. 10-2022-0002586 filed on Jan. 7, 2022, in the Korean Intellectual Property Office (KIPO), the disclosure of which is incorporated by reference herein in its entirety.

TECHNICAL FIELD

Embodiments of the inventive concept relate generally to a display device, and more particularly to a foldable display device capable of folding and unfolding.

DISCUSSION OF THE RELATED ART

Flexible display devices capable of being deformed into various shapes have been under recent development. Unlike a flat panel display device, a flexible display device, can be folded, bent, or rolled like paper. A flexible display device may be easier to carry than a flat panel foldable display device and may improve a user convenience.

One type of flexible display device is a foldable display device. These devices have been in the spotlight recently. One characteristic of a foldable display device is that it may be repeatedly folded or unfolded. Foldable display devices may also include a display module having a flexible characteristic and a support member disposed on a lower surface of the display module. The support member may have relatively high rigidity, and thus may serve to prevent deformation of the display module by a user's touch.

SUMMARY

Embodiments of the inventive concept provide a foldable display device with improved durability against external impacts.

A foldable display device according to an embodiment may include a display module including a first non-folding area, a second non-folding area, and a folding area between the first non-folding area and the second non-folding area, a support member disposed under the display module including a first support layer overlapping the first non-folding area, and a second support layer overlapping the second non-folding area, a pattern layer overlapping the folding area, surrounding the first support layer and the second support layer, the pattern layer including a metal material, and a digitizer disposed under the support member.

In an embodiment, the pattern layer may overlap an edge of the display module.

In an embodiment, the pattern layer may include a first portion overlapping the folding area and a second portion extending from the first portion and overlapping the edge of the display module.

In an embodiment, an opening pattern may be defined in the first portion of the pattern layer.

In an embodiment, the second portion of the pattern layer may have a frame shape having a constant width.

In an embodiment, the second portion of the pattern layer may have the width of about 1 mm to about 2 mm.

In an embodiment, a side surface of each of the first support layer and the second support layer may contact a side surface of the pattern layer.

In an embodiment, each of the first support layer and the second support layer may be spaced apart from the pattern layer in a plan view.

In an embodiment, each of the first support layer and the second support layer may be spaced apart from the pattern layer by an amount greater than 0 mm and less than or equal to about 0.1 mm.

In an embodiment, the foldable display device may further include an adhesive layer located between the support member and the digitizer, and each of the first support layer, the second support layer, and the pattern layer may be attached to the digitizer, through the adhesive layer.

In an embodiment, the pattern layer may not overlap the first support layer and the second support layer.

In an embodiment, the first support layer, the second support layer, and the pattern layer may be disposed on a same layer.

In an embodiment, each of the first support layer and the second support layer may include a material different from a material of the pattern layer.

In an embodiment, each of the first support layer and the second support layer may include at least one of glass and plastic.

In an embodiment, the digitizer may include a first digitizer and a second digitizer spaced apart from the first digitizer.

In an embodiment, the first digitizer may overlap the first support layer and the second digitizer may overlap the second support layer.

A foldable display device according to an embodiment may include a display module including a first non-folding area, a second non-folding area, and a folding area between the first non-folding area and the second non-folding area, a support member disposed under the display module and including a first support layer overlapping the first non-folding area, a second support layer overlapping the second non-folding area, and a pattern layer overlapping the folding area along a first direction and including a protrusion protruding in a second direction crossing the first direction, and a digitizer disposed under the support member.

In an embodiment, the pattern layer may have an I-shape.

In an embodiment, each of the first support layer and the second support layer may include a material different from a material of the pattern layer.

In an embodiment, the pattern layer may include a metal composition and each of the first support layer and the second support layer may include at least one of glass composition and a transparent plastic.

In a foldable display device according to embodiments of the inventive concept, since the pattern layer surrounds the first support layer and the second support layer and overlaps a bottom edge of the display module, deformation of the support member due to the external impact may be prevented. In addition, the second portion of the pattern layer may form a ground path. Accordingly, the second portion of the pattern layer may protect the display panel from external electrostatic discharge.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION OF EMBODIMENTS

Figure 1:
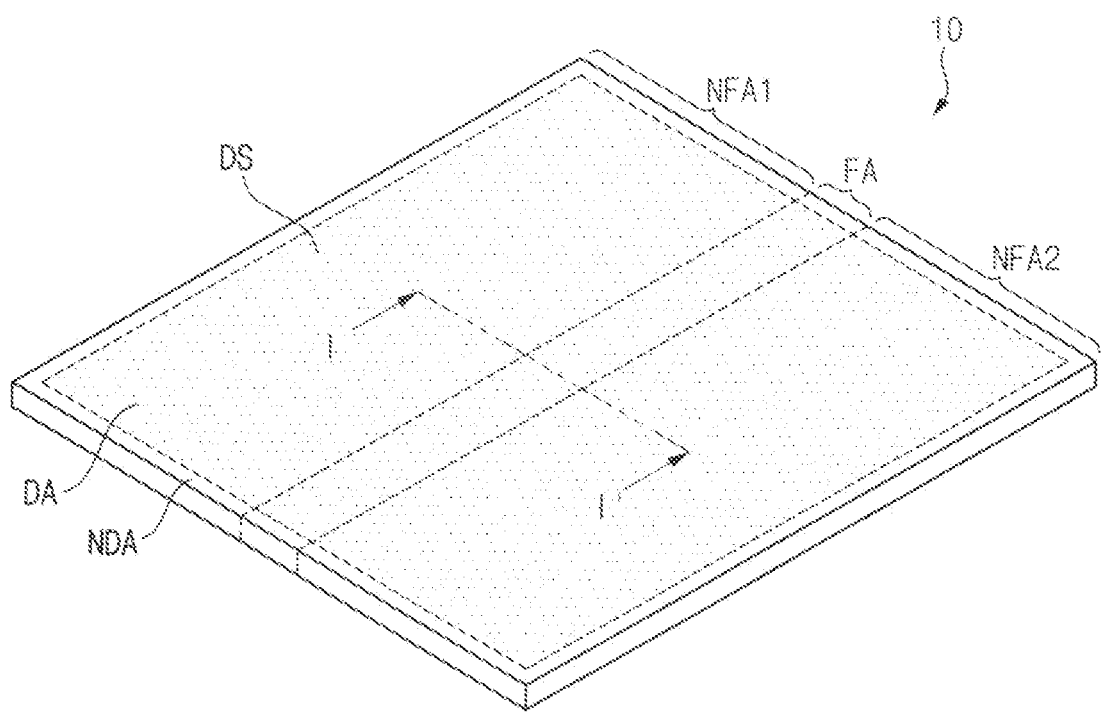
FIG. 1 is a perspective view illustrating a foldable display device according to an embodiment.
Figure 1:
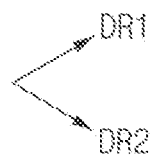

It will be understood that when an element (or area, layer, or portion) is referred to as being "on", "connected to" or "coupled to" another element or layer, it can be directly on, connected or coupled to the other element or layer or intervening elements or layers may be present. It will also be understood that when a component is referred to as being "between" two components or elements, it can be the only component between the two components, or one or more intervening components may also be present. It will also be understood that when a component is referred to as "covering" another component, it can be the only component covering the other component or element, or one or more intervening components may also be covering the other component. Other words use to describe the relationship between elements should be interpreted in a like fashion It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "may include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Herein, when one value is described as being about equal to another value or being substantially the same as or equal to another value, it is to be understood that the values are equal to each other to within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art.

The following exemplary embodiments of the inventive concept are provided to those skilled in the art in order to describe the inventive concept more completely. Accordingly, shapes and sizes of elements shown in the drawings may be exaggerated for clarity.

Hereinafter, a foldable display device in accordance with embodiments of the inventive concept will be described in more detail with reference to the accompanying drawings. The same reference numerals are used for the same components in the drawings, and redundant descriptions of the same components will be omitted.

Figure 2:
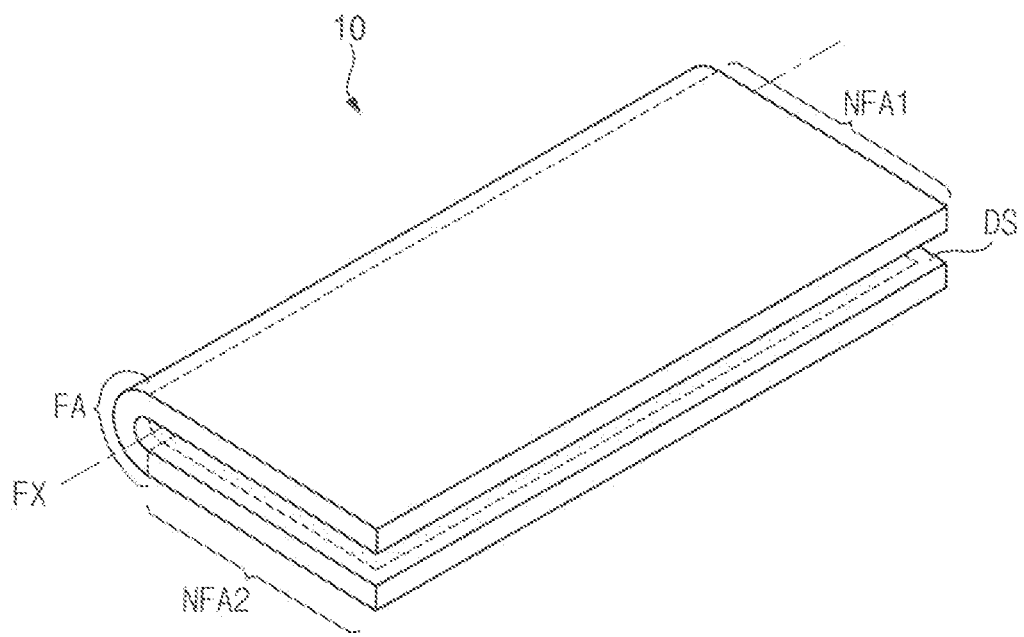
FIG. 2 is a perspective view illustrating a folded state of the foldable display device of FIG. 1 according to an embodiment.
Figure 2:
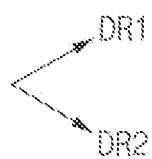

FIG. 1 is a perspective view illustrating a foldable display device according to an embodiment. FIG. 2 is a perspective view illustrating a folded state of the foldable display device of FIG. 1.

Referring to FIGS. 1 and 2, according to an embodiment, a foldable display device 10 may have a rectangular planar shape. For example, the foldable display device 10 may have both two side surfaces extending in a first direction DR1 and two side surfaces extending in a second direction DR2, perpendicular to the first direction DR1. However, a shape of the foldable display device 10 is not particularly limited thereto, and may have various shapes other than what is shown and described herein.

Referring to FIGS. 1 and 2, the foldable display device 10 may include a display surface DS. The foldable display device 10 may display an image through the display surface DS. The display surface DS may be disposed over a folding area FA and non-folding areas NFA1 and NFA2 to be described in greater detail further below. In an embodiment, the display surface DS may be a front surface of the foldable display device 10. In another embodiment, the display surface DS may be both a front surface and a rear surface of the foldable display device 10.

Referring to FIG. 1, the display device 10 may include a display area DA and a non-display area NDA. The display area DA may display an image. A plurality of pixels may be disposed in the display area DA.

The non-display area NDA may be disposed around the display area DA, as shown in FIG. 1. The non-display area NDA may surround at least a portion of the display area DA. The non-display area NDA may not display an image. A black matrix may be disposed in the non-display area NDA.

The display device 10 may be a foldable display device. The foldable display device 10 may make a transition between a folded state and an unfolded state. As used herein, the term 'folding' may include the term 'bending'. In an embodiment, the foldable display device 10 may be folded or unfolded so that a first portion faces a second portion. In an embodiment, the first portion may form a predetermined inclination with respect to the second portion. In an embodiment, a first portion of the foldable display device 10 may be folded to form an angle greater than about 0 degrees and less than about 180 degrees with respect to a second portion. In an embodiment, the first portion may be unfolded to form an angle of about 180 degrees with respect to the second portion.

The foldable display device 10 may be folded inward (i.e., inward-folding) or outwardly (i.e., outward-folding). When folded inward, a first portion of the display surface DS of the foldable display device 10 may be folded to face the second portion of the display surface DS. When folded outward, a first portion of the display surface DS of the foldable display device 10 may be folded so as not to face a second portion of the display surface DS. In an embodiment, the act of inward-folding may constitute a state in which a first portion of the display surface DS is folded inward to form an angle greater than about 0 degrees and less than about 180 degrees with respect to a second portion of the display surface DS. In an embodiment, the act of outward-folding may be a state in which a first portion of the display surface DS is folded outward to form an angle greater than about 180 degrees and less than about 360 degrees with respect to a second portion of the display surface DS.

The foldable display device 10 may include the folding area FA and the non-folding areas NFA1 and NFA2. The folding area FA may be an area which is folded or bent when the foldable display device 10 is folded by a user. The non-folding areas NFA1 and NFA2 may be areas which are not folded or bent when the foldable display device 10 is folded by a user. The non-folding areas NFA1 and NFA2 may respectively include a first non-folding area NFA1 and a second non-folding area NFA2. The second non-folding area NFA2 may be disposed in a second direction DR2 with respect to the first non-folding area NFA1. The folding area FA may be disposed between the first non-folding area NFA1 and the second non-folding area NFA2.

The foldable display device 10 may have a folded state or an unfolded state. The folded state may include a bent state. For example, the folded state may be a state in which the first non-folding area NFA1 is folded to form a predetermined inclination with respect to the second non-folding area NFA2. Further, the unfolded state may be a state in which the first non-folding area NFA1 and the second non-folding area NFA2 are disposed in parallel on one plane. In an embodiment, in the folded state, an inclination between the first non-folding area NFA1 and the second non-folding area NFA2 may be greater than about 0 degrees and less than about 180 degrees, or greater than about 180 degrees and about 360 degrees with respect to the second non-folding area NFA2. In the unfolded state, the inclination between the first non-folding area NFA1 and the second non-folding area NFA2 may be about 180 degrees.

The foldable display device 10 may be folded or unfolded based on a folding axis FX (See FIG. 2), which may overlap the folding area FA.

Figure 3:
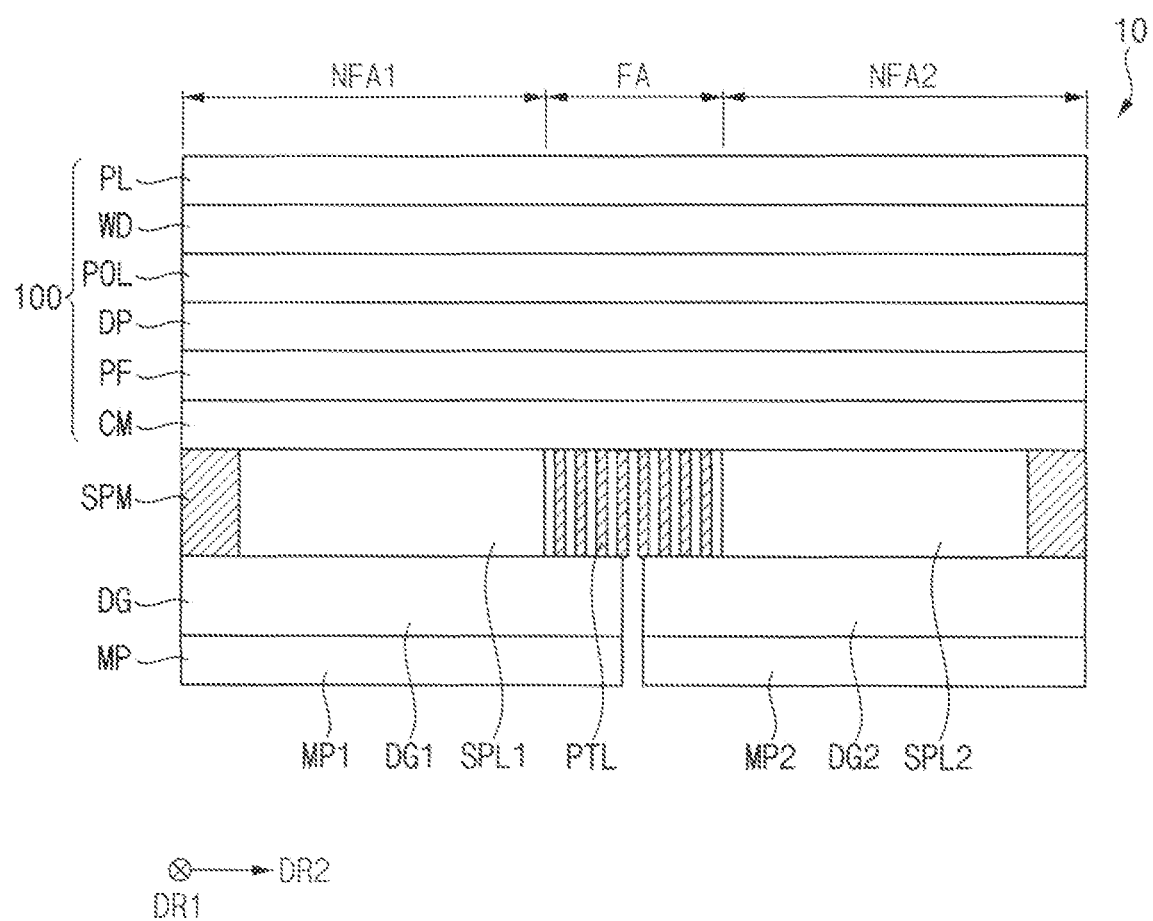
FIG. 3 is a cross-sectional view taken along line I-I' of FIG. 1 according to an embodiment.

FIG. 3 is a cross-sectional view taken along line I-I' of FIG. 1.

Referring to FIGS. 1 and 3, the foldable display device 10 may include a display module 100, a support member SPM, a digitizer DG, and a metal plate MP.

The display module 100 may be flexible. The foldable display device 10 includes a first non-folding area NFA1, a second non-folding area NFA2, and a folding area FA. The display module 100 may include the first non-folding area NFA1, the second non-folding area NFA2, and the folding area FA.

The display module 100 may include a cushion member CM, a protective film PF, a display panel DP, a polarizing layer POL, a window WD, and a protective layer PL.

The display panel DP may display an image. Embodiments of the display panel DP may include an organic light emitting display panel, an inorganic light emitting display panel, a quantum dot light emitting display panel, a micro LED display panel, a nano LED display panel, a plasma display panel, a field emission display panel, a cathode ray display panel, a liquid crystal display panel, an electrophoretic display panel, and the like.

The polarizing layer POL may be disposed on the display panel DP. The polarizing layer POL may polarize light passing therethrough. The polarizing layer POL may reduce external light reflection of the display device 10. In an embodiment, the polarizing layer POL may include a polyvinyl alcohol film. The polarizing layer POL may be stretched in one direction, which may be an absorption axis. A direction perpendicular to the stretched direction may be a transmission axis.

The window WD may be disposed on the polarizing layer POL. The window WD may protect the display panel DP. The window WD may include a transparent material. In an embodiment, the window WD may include a glass composition, a transparent plastic, and the like.

In an embodiment where the window WD includes a glass composition, the glass composition may be an ultra-thin glass composition (UTG). In an embodiment where the glass composition is an ultra-thin glass composition, the glass composition may be flexible. For example, a thickness of the glass composition may be from about 10 μm to about 300 μm.

The protective layer PL may be disposed on the window WD. The protective layer PL may perform a number of functions, including, but not limited to, scatter prevention, shock absorption, engraving preventing, fingerprint prevention, glare prevention. The protective layer PL may include a transparent polymer film. Examples of a transparent polymer film for use in the protective layer PL may include polyethylene terephthalate (PET), polyethylene naphthalate (PEN), polyethersulfone (PES), polyimide (PI), polyarylate (PAR), polycarbonate (PC), polymethyl methacrylate (PMMA), cycloolefin polymer (COP), etc.

The protective film PF may be disposed below the display panel DP. The protective film PF may reduce stress applied to the display panel DP when the display panel DP is folded or bent. In addition, the protective film PF may prevent moisture and the like from penetrating into the display panel DP, and may absorb external shock.

The protective film PF may be a plastic film. Non-limiting examples of a plastic film constituting the protective film PF may include polyimide (PI), polyethylene terephthalate (PET), polycarbonate (PC), polypropylene (PP), and polyethersulfone (PES), polymethyl methacrylate (PMMA), triacetyl cellulose (TAC), cycloolefin polymer (COP), etc.

The cushion member CM may be disposed below the protective film PF. The cushion member CM may protect the display panel DP by buffering an external shock which may be applied to the display panel DP. Accordingly, the cushion member CM may include a material capable of buffering external shocks by including an air component such as a cushion or a sponge. Also, in order to facilitate folding and unfolding of the display panel DP, the cushion member CM may include a flexible material. Non-limiting examples of flexible materials constituting the cushion member CM may include polyacrylates resin, polyurethane, thermoplastic polyurethane (TPU), latex, polyurethane foam, polystyrene foam, etc.

The support member SPM may be disposed below the display module 100. The support member SPM may be flexible. The support member SPM may include a first support layer SPL1, a second support layer SPL2, and a pattern layer PTL. The first support layer SPL1 may be disposed on the first non-folding area NFA1, the second support layer SPL2 may be disposed on the second non-folding area NFA2. The pattern layer PTL may be disposed on the folding area FA.

The digitizer DG may be disposed below the support member SPM. The digitizer DG may recognize position information on the display surface DS of the foldable display device 10, with the position information being derived from a user's input device. Accordingly, the foldable display device 10 provides input means through the digitizer DG. The digitizer DG may recognize a movement of an input device (e.g., a stylus pen) on the display surface DS of the foldable display device 10 and convert the detected movement into a digital signal.

The digitizer DG may be disposed below the support member SPM. In this configuration, the support member SPM may prevent the digitizer DG from being viewed by a user through the display surface DS of the foldable display device 10.

The digitizer DG may include a first digitizer DG1 and a second digitizer DG2. The first digitizer DG1 may overlap the first support layer SPL1 and may be disposed below the first support layer SPL1. The second digitizer DG2 may overlap the second support layer SPL2 and may be disposed below the second support layer SPL2. The second digitizer DG2 may be spaced apart from the first digitizer DG1. The digitizer DG may be a separate digitizer including the first digitizer DG1 and the second digitizer DG2 spaced apart from each other. In an embodiment, the first digitizer DG1 and the second digitizer DG2 may be connected by a flexible printed circuit board. As the digitizer DG includes the first digitizer DG1 and the second digitizer DG2 spaced apart from each other, the digitizer DG may be prevented from being damaged by folding of the foldable display device 10.

The metal plate MP may be disposed below the digitizer DG. The metal plate MP may include a metal, such as, for example, stainless steel.

The metal plate MP may include a first metal plate MP1 and a second metal plate MP2. The first metal plate MP1 may be disposed below the first digitizer DG1. The second metal plate MP2 may be disposed below the second digitizer DG. The second metal plate MP2 may be spaced apart from the first metal plate MP1. The metal plate MP may be divided into the first metal plate MP1 and the second metal plate MP2 spaced apart from each other to facilitate folding the foldable display device 10.

The protective layer PL, the window WD, the polarizing layer POL, the display panel DP, the protective film PF, the cushion member CM, the support member SPM, the digitizer DG, and the metal plate MP may be attached to each other with adhesive layers (e.g., a first adhesive layer AM1 and a second adhesive layer AM2 (See FIG. 5) interposed therebetween. However, embodiments are not particularly limited. That is, in certain embodiments, the adhesive layers may be omitted altogether.

The adhesive layers may be provided with any one of a pressure sensitive adhesive (PSA), an optical clear adhesive (OCA), and an optical clear resin (OCR). However, embodiments are not particularly limited.

Figure 4:
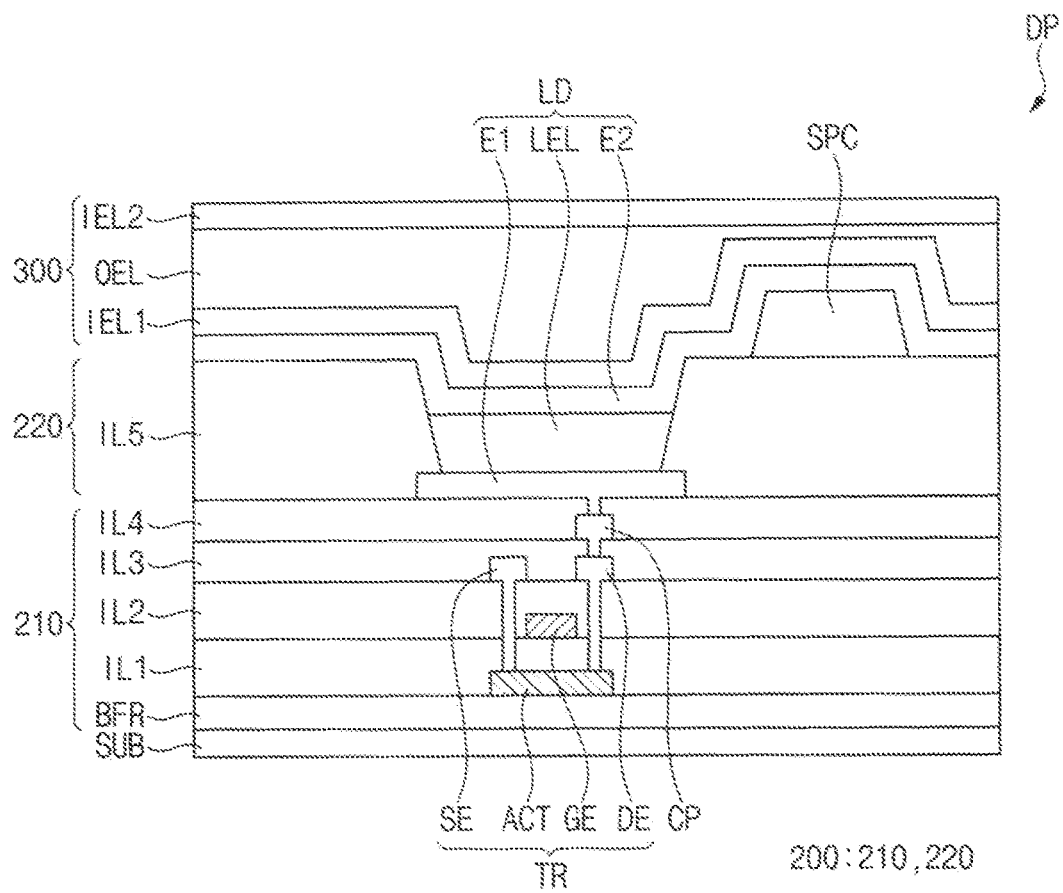
FIG. 4 is a cross-sectional view illustrating the display panel of FIG. 3 according to an embodiment.

FIG. 4 is a cross-sectional view illustrating the display panel of FIG. 3.

Referring to FIG. 4, the display panel DP may include a substrate SUB, a display element layer 200, and an encapsulation layer 300. The display element layer 200 may include a circuit element layer 210 and a light emitting element layer 220.

The circuit element layer 210 may be disposed on the substrate SUB, and may include a buffer layer BFR, at least one transistor TR, a connection electrode CP, a first insulation layer IL1, and a second insulation layer IL2, a third insulation layer IL3, and a fourth insulation layer IL4. The transistor TR may include an active layer ACT, a gate electrode GE, a source electrode SE, and a drain electrode DE. The light emitting element layer 220 may be disposed on the circuit element layer 210 and may include a fifth insulation layer IL5, a spacer SPC, and a light emitting diode LD. The light emitting diode LD may include a first electrode E1, a light emitting layer LEL, and a second electrode E2.

The buffer layer BFR may be disposed on the substrate SUB. The buffer layer BFR may prevent diffusion of metal atoms or impurities from the substrate SUB to the active layer ACT.

The active layer ACT may be disposed on the substrate SUB. The active layer ACT may be divided into a source region and a drain region doped with impurities, and a channel region between the source region and the drain region.

The first insulation layer IL1 may be disposed on the buffer layer BFR. The first insulation layer IL1 may cover the active layer ACT and may be formed to have substantially the same thickness along a profile of the active layer ACT. However, the present disclosure is not limited thereto. For example, the first insulation layer IL1 may include an inorganic material.

The gate electrode GE of transistor TR may be disposed on the first insulation layer IL1. In an embodiment, the gate electrode GE may overlap the channel region of the active layer ACT.

The second insulation layer IL2 may be disposed on the first insulation layer ILL In addition, the second insulation layer IL2 may cover the gate electrode GE of transistor TR and may be disposed to have substantially the same thickness along a profile of the gate electrode GE. However, the configuration is not particularly limited.

The source electrode SE of transistor TR and the drain electrode DE transistor TR may be disposed on the second insulation layer IL2. The source electrode SE may contact the source region of the active layer ACT through a first contact hole formed in the first and second insulation layers IL1 and IL2. The drain electrode DE may contact the drain region of the active layer ACT through a second contact hole formed in the first and second insulation layers IL1 and IL2.

The third insulation layer IL3 may be disposed on the second insulation layer IL2. The third insulation layer IL3 may cover the source and drain electrodes SE and DE, and may have a substantially flat top surface without creating a step around the source and drain electrodes SE and DE. For example, the third insulation layer IL3 may include an organic material.

The connection electrode CP may be disposed on the third insulation layer IL3. The connection electrode CP may contact the source electrode SE or the drain electrode DE through a third contact hole formed in the third insulation layer IL3.

The fourth insulation layer IL4 may be disposed on the third insulation layer IL3. The fourth insulation layer IL4 may cover the connection electrode CP, and may have a substantially flat top surface without creating a step around the source and drain electrodes SE and DE. For example, the fourth insulation layer IL4 may include an organic material.

The first electrode E1 may be disposed on the fourth insulation layer IL4. The first electrode E1 may have reflective or transmissive properties. For example, the first electrode E1 may include a metal.

The first electrode E1 may contact the connection electrode CP through a fourth contact hole formed in the fourth insulation layer IL4, thus allowing the first electrode E1 to be connected to the transistor TR.

The fifth insulation layer IL5 may be disposed on the fourth insulation layer IL4, and an opening exposing an upper surface of the first electrode E1 may be defined in the fifth insulation layer IL5. In an embodiment, the fifth insulation layer IL5 may include an organic material or an inorganic material.

The spacer SPC may be disposed on the fifth insulation layer IL5. The spacer SPC may include an organic material or an inorganic material. The spacer SPC may maintain a gap between the encapsulation layer 300 and the display element layer 200.

The spacer SPC may include a material different from that of the fifth insulation layer IL5. The spacer SPC may be formed after the fifth insulation layer IL5 is formed. However, the formation of the layers is not particularly limited thereto. The spacer SPC may include the same material as the fifth insulation layer IL5. For example, the fifth insulation layer IL5 and the spacer SPC may include an organic material such as a polyimide. Also, the fifth insulation layer IL5 and the spacer SPC may be simultaneously formed using a halftone mask.

The light emitting layer LEL of the light emitting diode LD may be disposed on the first electrode E1. For example, the light emitting layer LEL may be disposed on the first electrode E1 in the opening formed in the fifth insulation layer IL5. In an embodiment, the light emitting layer LEL of the light emitting diode LD may have a multilayer structure including a hole injection layer, a hole transport layer, an organic emission layer, an electron transport layer, and an electron injection layer. The organic emission layer may include a light emitting material.

The second electrode E2 may cover the light emitting layer LEL, and may be disposed on the fifth insulation layer IL5 and the spacer SPC. In an embodiment, the second electrode E2 may have a plate shape. In addition, the second electrode E2 may have reflective or transmissive properties. The second electrode E2 may include a metal.

The encapsulation layer 300 may prevent moisture and oxygen from penetrating into the light emitting diode LD from the outside. For example, the encapsulation layer 300 may include a first inorganic encapsulation layer IEL1, an organic encapsulation layer OEL, and a second inorganic encapsulation layer IEL2.

The first inorganic encapsulation layer IEL1 may be disposed on the second electrode E2 to have substantially the same thickness along a profile of the second electrode E2. The organic encapsulation layer OEL may be disposed on the first inorganic encapsulation layer IEL1, and may have a substantially flat top surface without creating a step around the first inorganic encapsulation layer IEL1. The second inorganic encapsulation layer IEL2 may be disposed on the organic encapsulation layer OEL.

Figure 5:
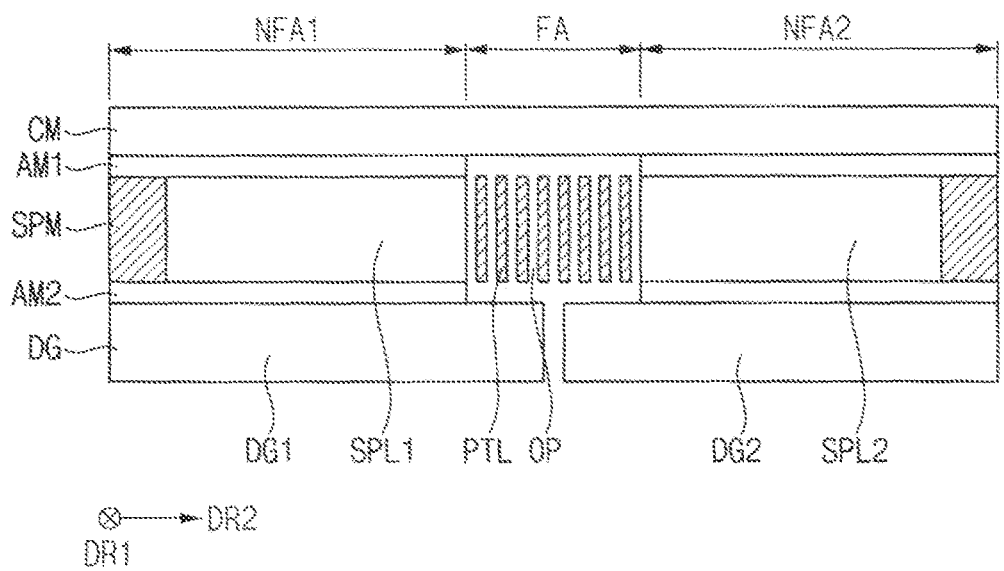
FIG. 5 is a cross-sectional view illustrating only a portion of the foldable display device of FIG. 3 according to an embodiment.

FIG. 5 is a cross-sectional view illustrating only a portion of the foldable display device 10 of FIG. 3. For example, FIG. 5 is a view illustrating only the digitizer DG, the support member SPM, and the cushion member CM of the foldable display device 10 of FIG. 3.

Referring to FIG. 5, a first adhesive layer AM1 may be disposed between the support member SPM and the cushion member CM. The support member SPM and the cushion member CM may be attached to each other by the first adhesive layer AM1.

A second adhesive layer AM2 may be disposed between the support member SPM and the digitizer DG. The support member SPM and the digitizer DG may be attached to each other by the second adhesive layer AM2. Each of the first adhesive layer AM1 and the second adhesive layer AM2 may be separated into two parts spaced apart from each other. As each of the first adhesive layer AM1 and the second adhesive layer AM2 is separated into the two parts, folding of the foldable display device (e.g., the foldable display device 10 of FIG. 1) may be facilitated.

A filling member may be further disposed between the support member SPM and the digitizer DG. The filling member may fill an opening pattern OP defined in the pattern layer PTL.

Figure 6:
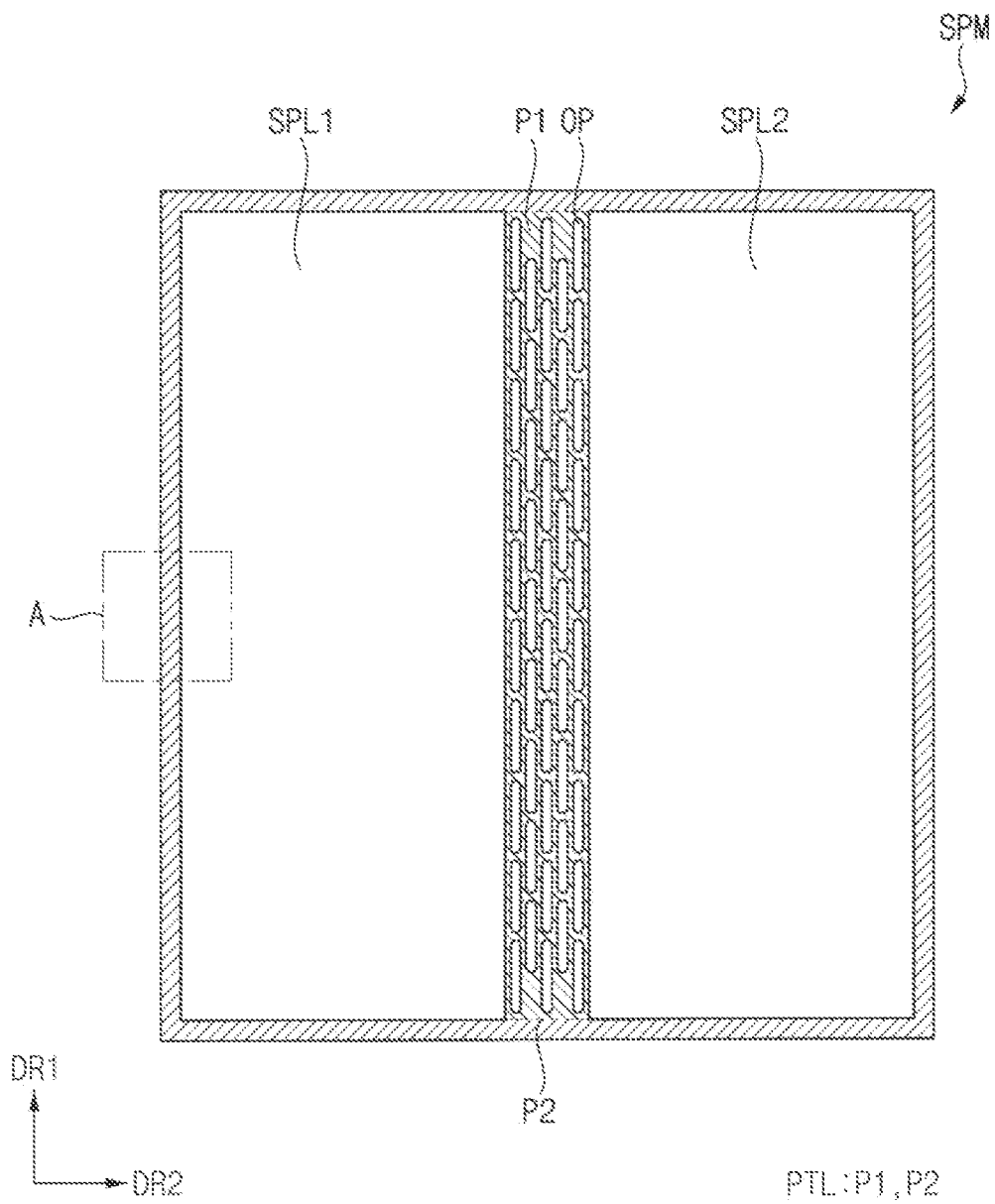
FIG. 6 is a plan view illustrating a support member according to an embodiment.

FIG. 6 is a plan view illustrating a support member according to an embodiment of the inventive concept.

Referring now to FIGS. 3, 5, and 6, the support member SPM may include the first support layer SPL1, the second support layer SPL2, and the pattern layer PTL. The first support layer SPL1 may overlap the first non-folding area NFA1, the second support layer SPL2 may overlap the second non-folding area NFA2, the pattern layer PTL may overlap the folding area FA, The pattern layer PTL may overlap an edge of the display module 100. That is, the pattern layer PTL may surround the first support layer SPL1 and the second support layer SPL2 as best shown in FIG. 6.

The first support layer SPL1 and the second support layer SPL2 may include different materials from the pattern layer PTL. The pattern layer PTL may include a metal as a conductive material. Examples of metals constituting the pattern layer PTL may include stainless steel, copper (Cu), graphite, etc. In an embodiment, the first support layer SPL1 and the second support layer SPL2 may not include a metal as a conductive material. Each of the first support layer SPL1 and the second support layer SPL2 may include a non-conductive material, for example, at least one of a glass composition or a transparent plastic.

As shown in FIG. 6, the pattern layer PTL may include a first portion P1 and a second portion P2. The first portion P1 may overlap the folding area FA, as shown in FIG. 3. An opening pattern OP may be defined in the first portion P1. The opening pattern OP may include a plurality of openings. Each of the openings may have one of a rectangular shape, a rhombus shape, an elliptical shape, a wavy shape, and a rounded rectangle shape. However, it should not be particularly limited.

The second portion P2 of pattern layer PTL may extend from the first portion P1 and may overlap the edge of the display module 100. That is, the second portion P2 may entirely surround the first support layer SPL1, the second support layer SPL2, and the first portion P1.

Each of the first support layer SPL1, the second support layer SPL2, and the pattern layer PTL may contact each other through the digitizer DG and the second adhesive layer AM2. That is, the first support layer SPL1 may not directly attach to the pattern layer PTL, and the second support layer SPL2 may not directly attach to the pattern layer PTL.

Figure 7:
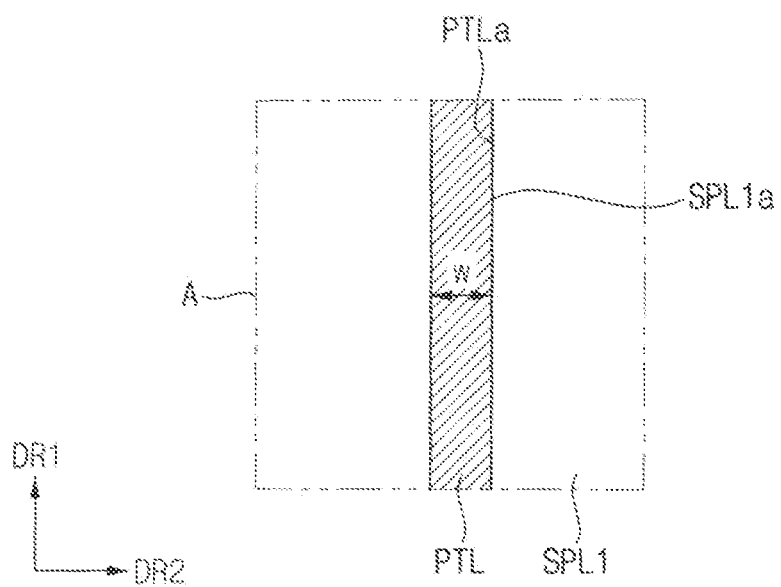
FIG. 7 is an enlarged plan view of area A of FIG. 6 according to an embodiment.

FIG. 7 is an enlarged plan view of area A of FIG. 6.

Referring to FIG. 7, the pattern layer PTL may not overlap the first support layer SPL1 and the second support layer SPL2. The first support layer SPL1, the second support layer SPL2, and the pattern layer PTL may be disposed on the same layer. The first support layer SPL1, the second support layer SPL2, and the pattern layer PTL may be disposed on the same layer and may be adjacent to each other.

A side surface SPL1a of the first support layer SPL1 and a side surface SPL2a of the second support layer SPL2 (not shown) may contact respective side surfaces PTLa1 and PTLa2 of the pattern layer PTL. That is, the first support layer SPL1 and the pattern layer PTL are not attached to each other, but may contact each other. Similarly, the second support layer SPL2 and the pattern layer PTL are not attached to each other, but may contact each other.

The second portion P2 of the pattern layer PTL may have a frame shape having a constant width. The second portion P2 may have a width W of about 1 mm to about 2 mm. When the second portion P2 is smaller than about 1 mm, an area of the second portion P2 which is attached to the second adhesive layer AM2 may be reduced. In this case, the pattern layer PTL may be vulnerable to external impact.

When the width W of the second portion P2 of the pattern layer PTL is greater than about 2 mm, an overlapping area between the pattern layer PTL and the digitizer DG disposed below the support member SPM may increase. In this case, the second portion P2 may interfere with the operation of the digitizer DG, so that the digitizer DG may not properly recognize the movement.

In an embodiment, the pattern layer PTL surrounds the first support layer SPL1 and the second support layer SPL2 and overlaps an edge of the display module 100, thereby preventing deformation of the support member SPM due to external impacts. Also, the second portion P2 of the pattern layer PTL may form a ground path. Accordingly, the second portion P2 of the pattern layer PTL may protect the display panel DP from external electrostatic discharge.

Figure 8:
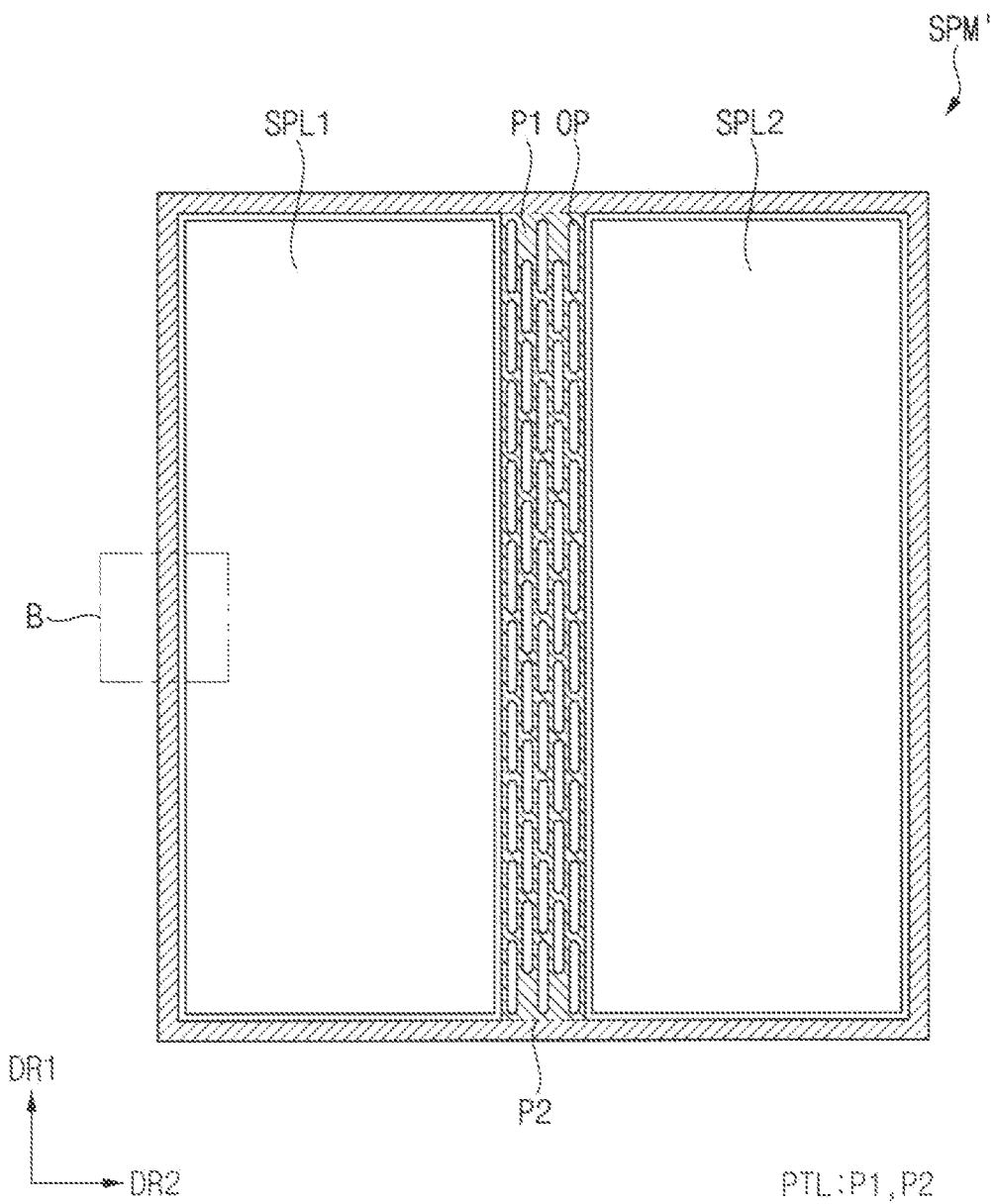
FIG. 8 is a plan view illustrating another example of a support member of FIG. 6 according to an embodiment.
Figure 9:
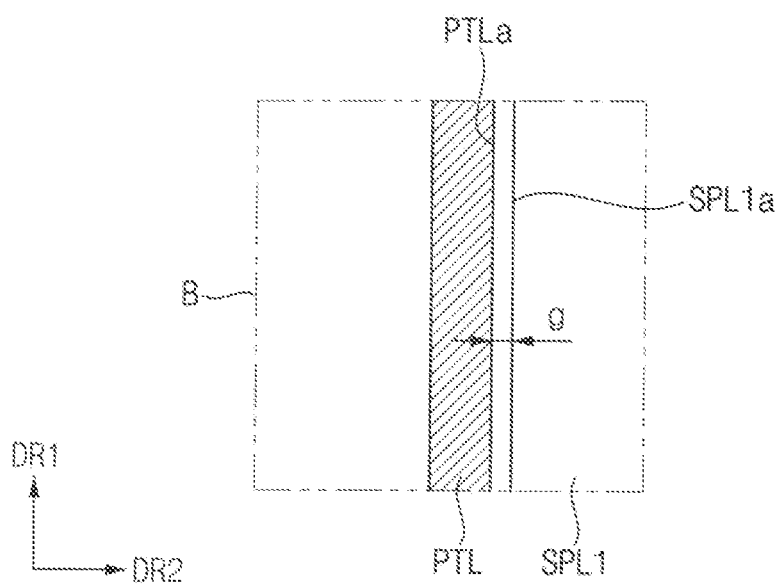
FIG. 9 is an enlarged plan view of area B of FIG. 8 according to an embodiment.

FIG. 8 is a plan view illustrating a further embodiment of a support member according to the inventive concept. FIG. 9 is an enlarged plan view of area B of FIG. 8.

With reference to FIGS. 8 and 9, the support member SPM', shares a number of features with the support member SPM described above with reference to FIGS. 6 and 7. Similar features of the respective embodiments (SPM, SPM") will not be repeated below.

Referring to FIG. 8, the support member SPM' may include a first support layer SPL1, a second support layer SPL2, and a pattern layer PTL. The pattern layer PTL may include a first portion P1 and a second portion P2.

The pattern layer PTL may not overlap the first support layer SPL1 and the second support layer SPL2. The first support layer SPL1, the second support layer SPL2, and the pattern layer PTL may be disposed on the same layer. The first support layer SPL1, the second support layer SPL2, and the pattern layer PTL may be disposed on the same layer and may be adjacent to each other.

In a plan view, each of the first support layer SPL1 and the second support layer SPL2 may be spaced apart from the pattern layer PTL. That is, there may be a certain gap spacing "g" between the first support layer SPL1 and the pattern layer PTL, (See FIG. 9) and there may also be a certain gap spacing "g" between the second support layer SPL2 and the pattern layer PTL (not shown). Accordingly, due to the gap spacing "g", a side surface SPL1a of the first support layer SPL1 may not contact a side surface PTLa of the pattern layer PTL, and a side surface of the second support layer SPL2 may not contact the side surface PTLa of the pattern layer PTL.

Therefore, unlike the support member SPM of the previous embodiment, described above with reference to FIGS. 5 and 6, the first support layer SPL1 and the second support layer SPL2 included in the support member SPM' of the present embodiment, described with reference to FIGS. 8 and 9, may be spaced apart from the pattern layer PTL by a gap spacing "g" greater than 0 mm and less than or equal to about 0.1 mm. When the gap spacing "g" is greater than about 0.1 mm, bending in the support member SPM' may become severe. Accordingly, durability of the foldable display device 10 may be reduced.

Figure 10:
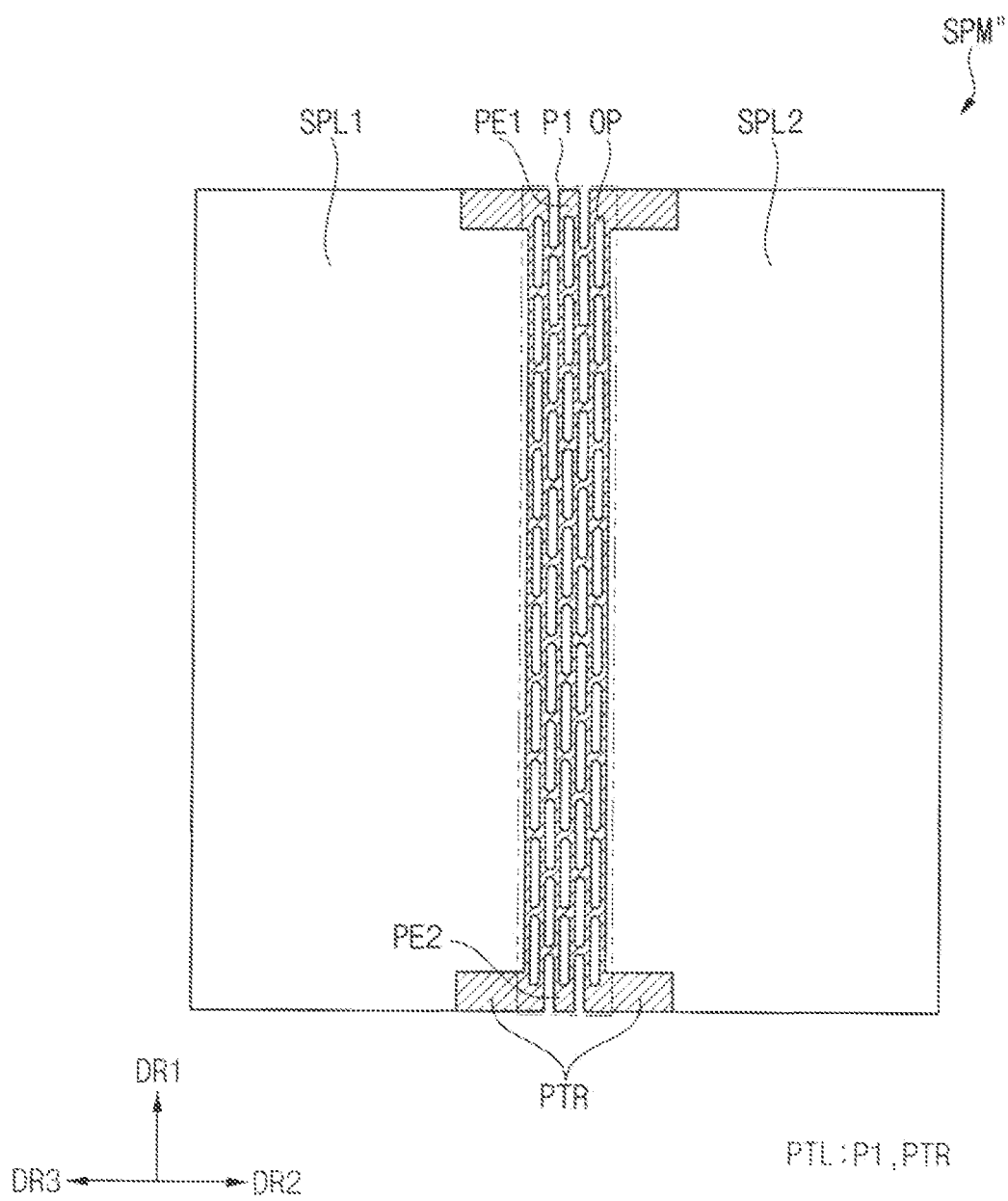
FIG. 10 is a plan view illustrating a support member according to an embodiment.

FIG. 10 is a plan view illustrating a support member SPM" according to a third embodiment.

A support member SPM" described with reference to FIG. 10 may be equivalent in most respects to the support member SPM of the embodiment described above with reference to FIGS. 6 and 7 except for the shape of the pattern layer PTL. Accordingly, a description of similar features will be omitted.

Referring to FIG. 10, the support member SPM" may include a first support layer SPL1, a second support layer SPL2, and a pattern layer PTL. The first support layer SPL1 may overlap the first non-folding area NFA1, the second support layer SPL2 may overlap the second non-folding area NFA2, and the pattern layer PTL may overlap the folding area FA.

The pattern layer PTL may include a first portion P1 and a protrusion PTR. The first portion P1 may overlap the folding area FA in the first direction DR1. An opening pattern OP may be defined in the first portion P1.

The protrusion PTR may protrude in the second direction DR2. The protrusion PTR may also protrude in a third direction DR3 opposite to the second direction DR2. The pattern layer PTL including the first portion P1 and the protrusion PTR may have an I-shape. That is, the protrusion PTR may protrude from a first end PE1 of the first portion P1 in both the second direction DR2 and the third direction DR3, and may protrude from a second end PE2 of the first portion P1 in both the second direction DR2 and the third direction DR3. The second end PE2 may be positioned opposite to the first end PE1.

However, embodiments according to the inventive concept are not limited thereto. For example, in an embodiment, the protrusion PTR may protrude from one of the first end PE1 and the second end PE2 in both the second direction DR2 and the third direction DR3. Also, it is contemplated that the protrusion PTR may protrude from the first end PE1 and the second end PE2 in one of the second direction DR2 and the third direction DR3.

The first support layer SPL1 and the second support layer SPL2 may include different materials from the pattern layer PTL. The pattern layer PTL may include a metal material as a conductive material. For example, the conductive metal material constituting the pattern layer PTL may include stainless steel, copper (Cu), graphite, etc. The first support layer SPL1 and the second support layer SPL2 may not include a conductive metal material. Each of the first support layer SPL1 and the second support layer SPL2 may include a non-conductive material. For example, each of the first support layer SPL1 and the second support layer SPL2 may include at least one of a glass material and a plastic material.

The pattern layer PTL may not overlap the first support layer SPL1 and the second support layer SPL2. The first support layer SPL1, the second support layer SPL2, and the pattern layer PTL may be disposed on the same layer. The first support layer SPL1, the second support layer SPL2, and the pattern layer PTL may be disposed on the same layer and may be adjacent to each other.

A side surface of each of the first support layer SPL1 and the second support layer SPL2 may contact a side surface of the pattern layer PTL. That is, the first support layer SPL1 and the pattern layer PTL may not be attached to each other, but may instead contact each other. Similarly, the second support layer SPL2 and the pattern layer PTL may not be attached to each other, but may instead contact each other.

In an embodiment, since the pattern layer PTL includes the protrusion PTR protruding from the first portion P1 overlapping the folding area FA, deformation of the support member SPM" caused by external impacts may be prevented.

Figure 11:
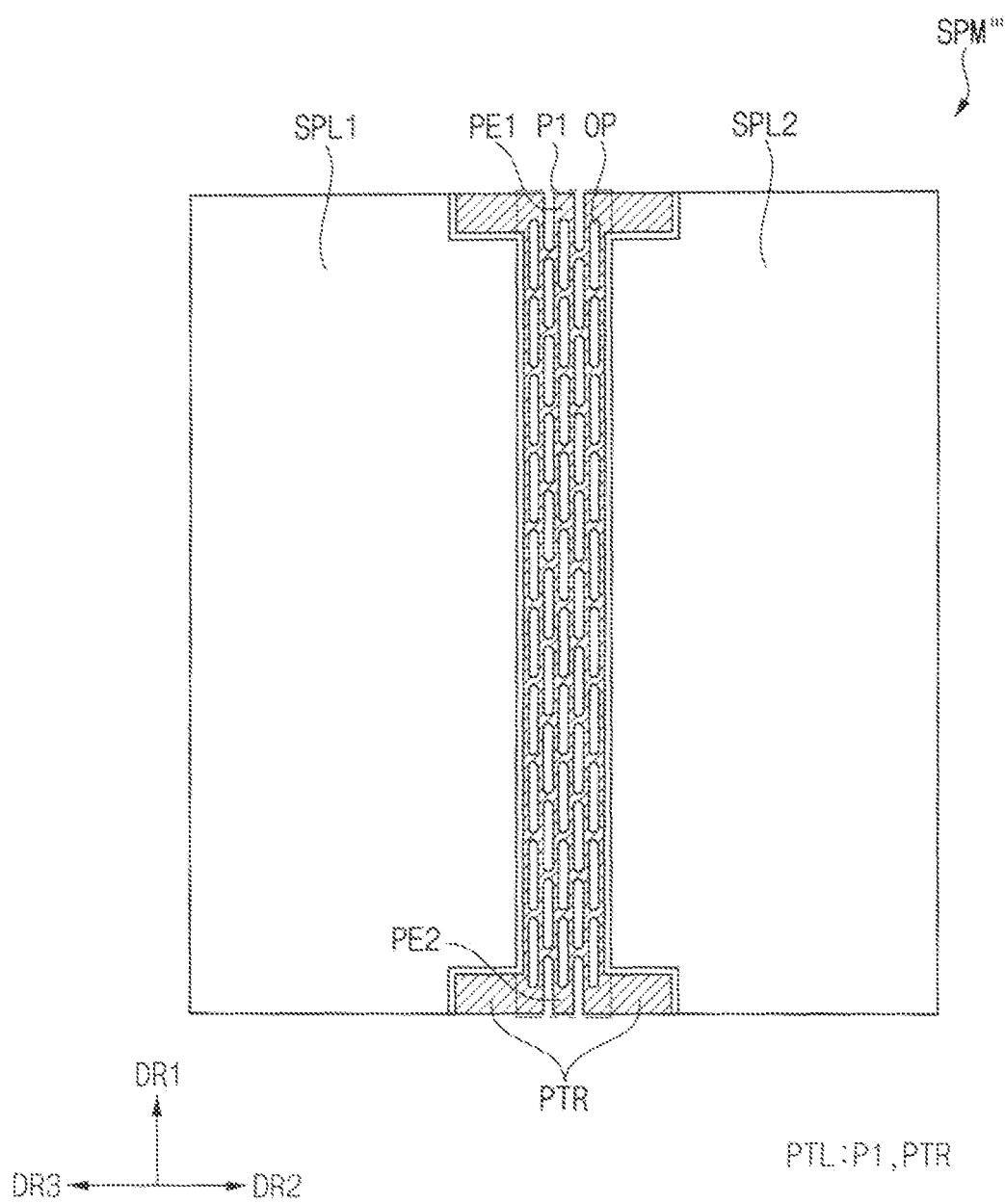
FIG. 11 is a plan view illustrating the support member of FIG. 10 according to an embodiment.

FIG. 11 is a plan view illustrating a further embodiment of the support member SPM" described with reference to FIG. 10.

The support member SPM''' illustrated in FIG. 11, will be described with reference to FIG. 10 omitting a description of similar features.

The support member SPM''' may include a first support layer SPL1, a second support layer SPL2, and a pattern layer PTL. The pattern layer PTL may include a first portion P1 and a protrusion PTR.

The pattern layer PTL may not overlap the first support layer SPL1 and the second support layer SPL2. The first support layer SPL1, the second support layer SPL2, and the pattern layer PTL may be disposed on the same layer. The first support layer SPL1, the second support layer SPL2, and the pattern layer PTL may be disposed on the same layer and may be adjacent to each other.

In a plan view, each of the first support layer SPL1 and the second support layer SPL2 may be spaced apart from the pattern layer PTL. That is, there may be a certain gap between the first support layer SPL1 and the pattern layer PTL, and there may also be a certain gap between the second support layer SPL2 and the pattern layer PTL.

Therefore, unlike the support member SPM" of FIG. 10, the first support layer SPL1 and the second support layer SPL2 included in the support member SPM''' of FIG. 11 may be spaced apart from the pattern layer PTL by greater than 0 mm and less than or equal to 0.1 mm. That is, the gap may be greater than 0 mm and less than or equal to about 0.1 mm. When the gap is greater than about 0.1 mm, flow in the support member SPM''' may become severe. Accordingly, durability of the foldable display device may be deteriorated.

The foldable display devices according to the embodiments may be applied to a foldable display device included in a computer, a notebook, a mobile phone, a smartphone, a smart pad, a PMP, a PDA, an MP3 player, or the like.

Although the foldable display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A foldable display device comprising:
   a display module including a first non-folding area, a second non-folding area, a folding area between the first non-folding area and the second non-folding area;
   a support member disposed below the display module including a first support layer overlapping the first non-folding area, a second support layer overlapping the second non-folding area, and a pattern layer including a conductive metal material; and
   a digitizer disposed below the support member,
   wherein the first support layer and the second support layer each include a material different from a material of the pattern layer,
   wherein the pattern layer overlaps the first and second non-folding areas and the folding area,
   wherein the pattern layer surrounds the first and second support layers in a first plane of the support member.

2. The foldable display device of claim 1,
   wherein the pattern layer overlaps an edge of the display module.

3. The foldable display device of claim 2,
   wherein the pattern layer includes a first portion overlapping the folding area and a second portion extending from the first portion and overlapping the bottom edge of the display module.

4. The foldable display device of claim 3,
   wherein an opening pattern is defined in the first portion of the pattern layer,
   wherein the opening pattern surrounds the first portion of the pattern layer in the first plane and in a second plane substantially perpendicular to the first plane.

5. The foldable display device of claim 3,
   wherein a frame shape of the second portion is configured to have a constant width.

6. The foldable display device of claim 5,
   wherein the second portion has a width from about 1 mm to about 2 mm.

7. The foldable display device of claim 1,
   wherein a side surface of the first support layer contacts a first side surface of the pattern layer, and wherein a side surface of the second support layer contacts a second side surface of the pattern layer.

8. The foldable display device of claim 1,
   wherein the first support layer and the second support layer are spaced apart from the pattern layer.

9. The foldable display device of claim 8,
   wherein the first support layer and the second support layer are spaced apart from the pattern layer by an amount greater than 0 mm and less than or equal to about 0.1 mm.

10. The foldable display device of claim 1, further comprising:
    an adhesive layer disposed between the support member and the digitizer, and
    wherein the first support layer, the second support layer and the pattern layer are attached to the digitizer through the adhesive layer.

11. The foldable display device of claim 1,
    wherein the pattern layer does not overlap the first support layer and the second support layer.

12. The foldable display device of claim 1,
    wherein the first support layer, the second support layer, and the pattern layer are disposed in the first plane.

13. The foldable display device of claim 1,
    wherein the first support layer, the second support layer, and the pattern layer each have a substantially same thickness normal to the first plane.

14. The foldable display device of claim 13, wherein the first support layer and the second support layer include at least one of a glass composition and a transparent plastic.

15. The foldable display device of claim 1, wherein the digitizer includes a first digitizer and a second digitizer spaced apart from the first digitizer.

16. The foldable display device of claim 15, wherein the first digitizer overlaps the first support layer and the second digitizer overlaps the second support layer.

17. A foldable display device comprising:
a display module including a first non-folding area, a second non-folding area, a folding area between the first non-folding area and the second non-folding area;
a support member disposed below the display module and including a first support layer overlapping the first non-folding area, a second support layer overlapping the second non-folding area, a pattern layer overlapping the folding area along a first direction, the pattern layer including a protrusion protruding in a second direction crossing the first direction; and
a digitizer disposed below the support member,
wherein the first support layer and the second support layer include a material different from a material of the pattern layer,
wherein the pattern layer is disposed in a first plane of the support member and has substantially a same thickness normal to the first plane as the first and second support layers.

18. The foldable display device of claim 17, wherein the pattern layer has an I-shape.

19. The foldable display device of claim 17, wherein an opening pattern is defined in the pattern layer, wherein the opening pattern surrounds the pattern layer in at least one of the first plane or a second plane substantially perpendicular to the first plane.

20. The foldable display device of claim 19, wherein the pattern layer includes a conductive metal material and the first support layer and the second support layer include at least one of a glass composition and a transparent plastic.

* * * * *